(12) United States Patent
Xiao et al.

(10) Patent No.: US 7,697,307 B2
(45) Date of Patent: Apr. 13, 2010

(54) POWER SUPPLY CIRCUIT FOR OUTPUTTING STEADY VOLTAGE

(75) Inventors: Hua Xiao, Shenzhen (CN); Tong Zhou, Shenzhen (CN)

(73) Assignees: Innocom Technology (Shenzhen) Co., Ltd., Shenzhen, Guangdon Province (CN); Innolux Display Corp., Miao-Li County (TW)

( * ) Notice: Subject to any disclaimer, the term of this patent is extended or adjusted under 35 U.S.C. 154(b) by 170 days.

(21) Appl. No.: 11/985,294

(22) Filed: Nov. 13, 2007

(65) Prior Publication Data
US 2008/0112199 A1 May 15, 2008

(30) Foreign Application Priority Data
Nov. 10, 2006 (TW) ............... 95141775 A

(51) Int. Cl.
H02M 3/335 (2006.01)
(52) U.S. Cl. ............... 363/21.01; 363/21.1; 363/21.18
(58) Field of Classification Search ............ 363/20, 363/21.01, 21.04, 21.07, 21.09, 21.1, 21.11, 363/21.12, 21.15, 21.17, 21.18, 97; 323/222, 323/223, 265, 282, 351
See application file for complete search history.

(56) References Cited

U.S. PATENT DOCUMENTS 4,866,367 A * 9/1989 Ridley et al. ............... 323/287
5,703,589 A 12/1997 Kalthoff et al.
7,433,208 B2 * 10/2008 Nishida et al. ............... 363/19
7,518,836 B2 * 4/2009 Kim et al. ............... 361/18
2006/0209481 A1 9/2006 Kim et al.

FOREIGN PATENT DOCUMENTS

WO 2006006289 A1 1/2006

* cited by examiner

Primary Examiner—Gary L Laxton
(74) Attorney, Agent, or Firm—Wei Te Chung

(57) ABSTRACT

An exemplary power supply circuit includes a transformer (21) having a primary coil (211) and a secondary coil (212); a rectification circuit and a transistor (26) respectively coupled to two terminals of the primary coil; a communicating and filter circuit (22) coupled to the secondary coil; a sampling circuit (13) having a first resistor (231) and a first capacitor (232) connected in series; and a pulse width modulation circuit (25) coupled between the transistor and the sampling circuit. Direct current (AC) voltage is applied to the rectification circuit and is converted into DC voltage via the transformer and the communicating and filter circuit. The DC voltage is fed back to the pulse width modulation circuit via a voltage applied to the first capacitor. The pulse width modulation circuit adjusts a gating time of the transistor so as to adjust the output DC voltage output by the power supply circuit.

8 Claims, 5 Drawing Sheets

POWER SUPPLY CIRCUIT FOR OUTPUTTING STEADY VOLTAGE

FIELD OF THE INVENTION

The present invention relates to power supply circuits, and more particularly to a power supply circuit that outputs a steady voltage.

GENERAL BACKGROUND

Electronic products such as personal computers, televisions, and Digital Video Disc (DVD) players are widely used in modern daily life. In general, a power supply circuit that outputs a steady voltage and has low power consumption is required in these kinds of electronic products.

FIG. 4 is a schematic diagram of a conventional power supply circuit. The power supply circuit 10 mainly includes a full bridge rectifier circuit (not labeled), a transformer 11, a communicating and filter circuit 12, a sampling circuit 13, an optical coupler 14, a pulse width modulation circuit 15, and a transistor 16.

The sampling circuit 13 includes a first resistor 131 and a second resistor 132. One terminal of the first resistor 131 is coupled to an output terminal 103 of the power supply circuit 10, and the other terminal of the first resistor 131 is coupled to an anode of a diode 17 via the second resistor 132. A cathode of the diode 17 is grounded via a capacitor 19. A third resistor 18 is coupled between the output terminal 103 of the power supply circuit 10 and the cathode of the diode 17. The resistances of the first, second, and third resistors 131, 132, 18 may be 100 ohm, 1000 ohm, and 10 kiloohm, respectively.

In use of the power supply circuit 10, an alternating current (AC) voltage is applied between a first and a second input terminals 101a, 101b of the power supply circuit 10. Then the AC voltage is converted to a direct current (DC) voltage via the full bridge rectifier circuit, the transformer 11, and the communicating and filter circuit 12. The DC voltage is then fed back to the optical coupler 14 via a voltage that is applied to the second resistor 132 of the sampling circuit 13.

A bias voltage is applied to a third input terminal 102 of the power supply circuit 10 to enable the optical coupler 14 to function. Then the feedback voltage is applied to the pulse width modulation circuit 15. According to the feedback voltage, the pulse width modulation circuit 15 adjusts a duty cycle of voltage applied to a gate electrode of the transistor 16. For example, the feedback voltage decreases along with a decreasing of the output voltage of the power supply circuit 10. Then the pulse width modulation circuit 15 increases a duty cycle of voltage applied to the transistor 16. Thereby, the gating time of the transistor 16 is increased so as to increase the output voltage of the power supply circuit 10. In an opposite example, when the output voltage of the power supply circuit 10 increases, the pulse width modulation circuit 15 decreases the gating time of the transistor 16 so as to decrease the output voltage of the power supply circuit 10.

The sampling circuit 13 is configured by including the first and the second resistors 131, 132, therefore there is a current flowing through the sampling circuit 13. This increases the power consumption of the power supply circuit 10. For example, if the resistances of the first and second resistors 131, 132 are 100 ohm and 1000 ohm, the power consumption of the sampling circuit 13 is about 5.3 milliwatt (mW).

Furthermore, when a load 104 is coupled to the power supply circuit 10, the load 104 is connected in parallel with the third resistor 18 and the sampling circuit 13, as shown in FIG. 5. Typically, a resistance of the load 104 varies in a large range. Therefore, the resistance of the parallel circuit configured by the load 104, the third resistor 18, and the sampling circuit 13 varies according to the resistance of the load 104. Because the resistance of the third resistor 18 is much larger than the total resistance of the first and second resistors 131, 132, the resistance of the third resistor 18 can be ignored when considering the resistance of the parallel circuit. Therefore, the resistance of the parallel circuit ranges from 0 ohm to 1100 ohm. That is, voltages applied to the sampling circuit 13 and a power consumption of the second resistor 132 each vary in a large range. As a result, the feedback voltage from the second resistor 132 is liable to be inaccurate. The inaccurate feedback voltage is amplified by the pulse width modulation circuit 15 to adjust the gating time of the transistor 16. Therefore the power supply circuit 10 may output voltage unstably.

What is needed, therefore, is a power supply circuit that can overcome the above-described deficiencies.

SUMMARY

In one aspect, power supply circuit includes a transformer, a rectification circuit, a transistor, a communicating and filter circuit, a sampling circuit, and a pulse width modulation circuit. The transformer includes a primary coil and a secondary coil. The sampling circuit includes a first resistor and a first capacitor connected in series. The rectification circuit and the transistor are respectively coupled to two terminals of the primary coil. The communicating and filter circuit is coupled to the secondary coil and the pulse width modulation circuit coupled between the transistor and the sampling circuit. Alternating current (AC) voltage is applied to the rectification circuit and is converted into direct current (DC) voltage via the transformer and the communicating and filter circuit. The DC voltage is fed back to the pulse width modulation circuit via a voltage applied to the first capacitor. The pulse width modulation circuit adjusts a gating time of the transistor so as to adjust the DC voltage output by the power supply circuit.

In another aspect, power supply circuit includes a transistor, an output terminal, a rectification circuit, a sampling circuit, and a pulse width modulation circuit. The transistor includes a gate electrode, a drain electrode, and a source electrode. The sampling circuit includes a resistor and a capacitor. The rectification circuit is coupled between the source electrode of the transistor and the output terminal and the pulse width modulation circuit coupled between the sampling circuit and the gate electrode. Direct current (DC) voltage is applied to the drain electrode of the transistor and is outputted at the output terminal via the transistor and the rectification circuit. The output DC voltage is fed back to the pulse width modulation circuit via a voltage applied to the first capacitor. The pulse width modulation circuit adjusts a gating time of the transistor so as to adjust the output DC voltage output by the power supply circuit.

Other novel features and advantages will become more apparent from the following detailed description when taken in conjunction with the accompanying drawings. All the drawings are schematic.

DETAILED DESCRIPTION OF PREFERRED EMBODIMENTS

Reference will now be made to the drawings to describe preferred and exemplary embodiments in detail.

Figure 1:
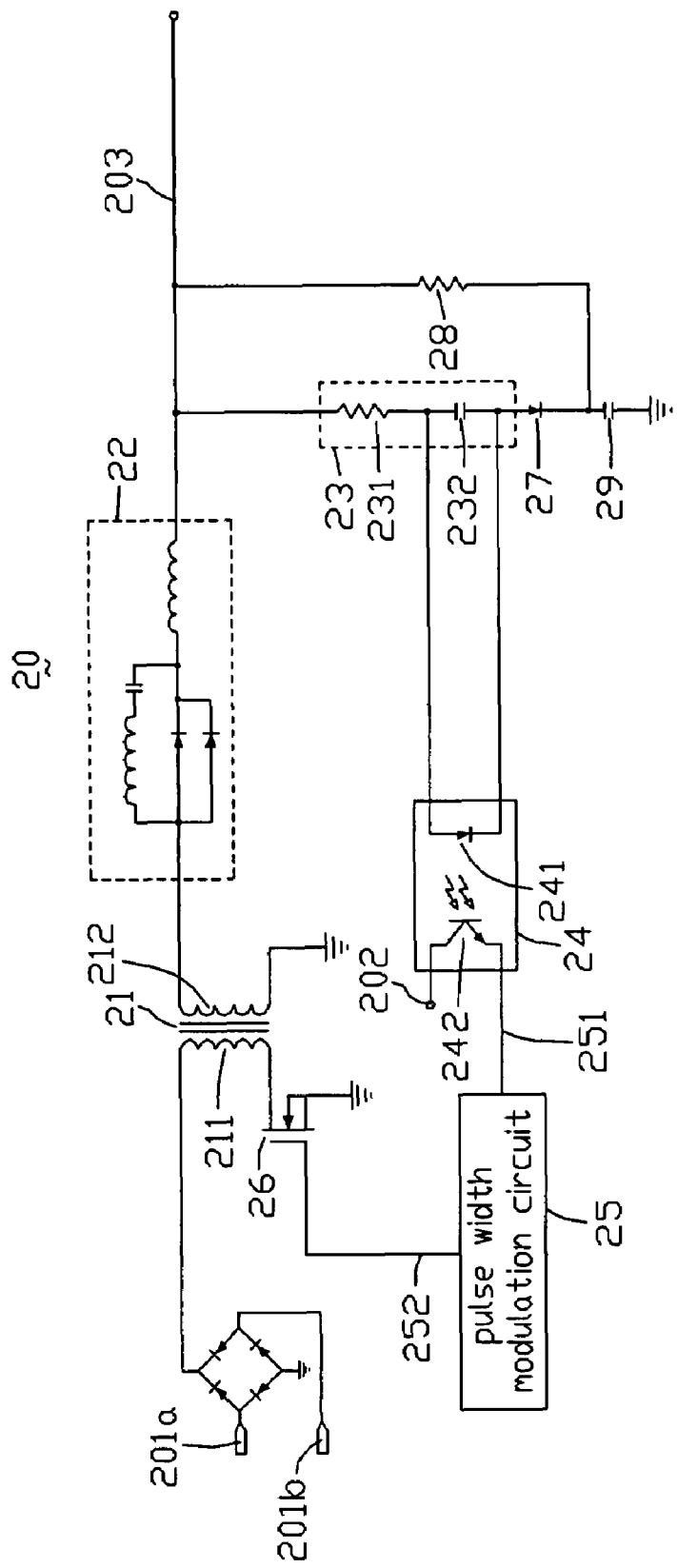
FIG. 1 is a diagram of a power supply circuit for converting AC voltage to DC voltage, according to a first embodiment of the present invention.

FIG. 1 is a schematic diagram of a power supply circuit for converting AC voltage to DC voltage, according to a first embodiment of the present invention. The power supply circuit 20 mainly includes a rectification circuit (not labeled), a transformer 21, a communicating and filter circuit 22, a sampling circuit 23, a feedback circuit (not labeled), a pulse width modulation circuit 25, and a transistor 26. In the illustrated embodiment, the feedback circuit may be an optical coupler 24, and the rectification circuit may be a full bridge rectifier circuit.

A first input terminal 201a and a second input terminal 201b of the power supply circuit 20 are coupled to two input terminals of the full bridge rectifier circuit. One output terminal of the full bridge rectifier circuit is grounded.

The transformer 21 includes a primary coil 211 and a secondary coil 212. One terminal of the primary coil 211 is coupled to the other output terminal of the full bridge rectifier circuit. The other terminal of the primary coil 211 is coupled to a drain electrode of the transistor 26. One terminal of the secondary coil 212 is grounded. The other terminal of the secondary coil 212 is coupled to an output terminal 203 of the power supply circuit 20 via the communicating and filter circuit 22.

The sampling circuit 23 includes a first resistor 231 and a first capacitor 232. One terminal of the first resistor 231 is coupled to the output terminal 203 of the power supply circuit 20. The other terminal of the first resistor 231 is coupled to an anode of a diode 27 via the first capacitor 232. A cathode of the diode 27 is grounded via a second capacitor 29. A second resistor 28 is coupled between the output terminal 203 and the cathode of the diode 27. Resistances of the first and second resistors 231, 28 may be 100 ohm and 10 kilohm, respectively. A capacitance of the first capacitor 232 may be 22 nanofarad.

The optical coupler 24 includes a light emitting diode 241 and a phototransistor 242. The light emitting diode 241 is connected in parallel with the second resistor 232, and an anode of the light emitting diode 241 is coupled to the first resistor 231. A collector electrode of the phototransistor 242 is coupled to a third input terminal 202 of the power supply circuit 20. An emitter electrode of the phototransistor 242 is coupled to an input terminal 251 of the pulse width modulation circuit 25. An output terminal 252 of the pulse width modulation circuit 25 is coupled to a gate electrode of the transistor 26. A source electrode of the transistor 26 is grounded.

In use of the power supply circuit 20, an AC voltage is applied between the first input terminal 201a and the second input terminal 201b. Then the AC voltage is converted to DC voltage via the full bridge rectifier circuit, the transformer 21, and the communicating and filter circuit 22. The DC voltage is then fed back to the light emitting diode 241 of the optical coupler 24, via a voltage applied to the first capacitor 232 of the sampling circuit 23.

A bias voltage is applied to the third input terminal 202, whereby the phototransistor 242 of the optical coupler 24 is turned on. Then the feedback voltage applied to the light emitting diode 241 of the optical coupler 24 is applied to the pulse width modulation circuit 25 via the emitter electrode of the phototransistor 242. According to the feedback voltage, the pulse width modulation circuit 25 adjusts a duty cycle of voltage applied to the gate electrode of the transistor 26 to adjust an output voltage of the power supply circuit 20.

The sampling circuit 23 is configured by the first resistor 231 and the first capacitor 232. Therefore, when the power supply circuit 20 outputs a steady voltage, there is no current flowing through the sampling circuit 23. Furthermore, the first capacitor 232 is an energy storage element. Therefore, the first capacitor 232 does not consume power. This reduces power consumption of the power supply circuit 20. For example, if a resistance of the first resistor 231 is 100 ohm, the power consumption of the sampling circuit 23 is about 0.4 milliwatt.

Figure 2:
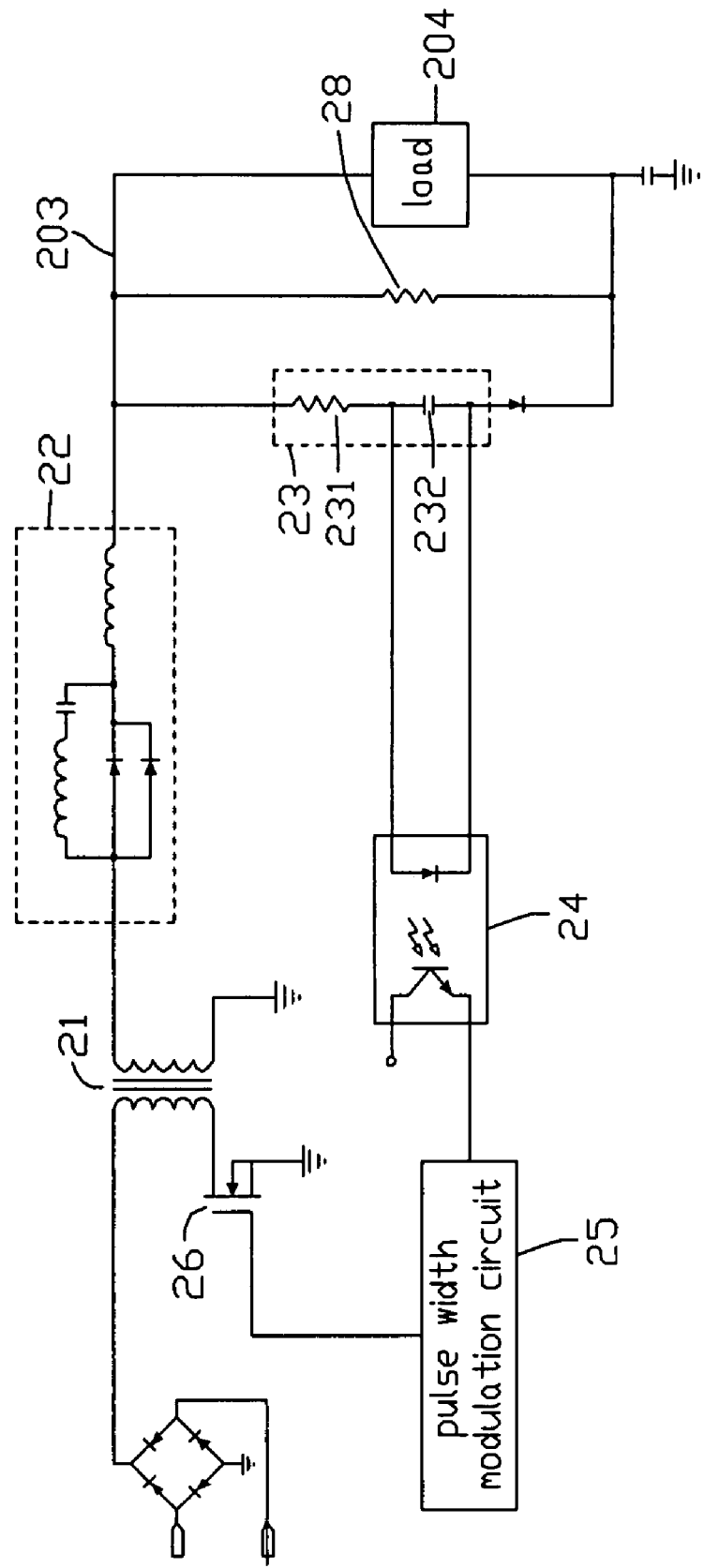
FIG. 2 is similar to FIG. 1, but showing a load coupled to the power supply circuit.

As shown in FIG. 2, when a load 204 is coupled to the power supply circuit 20, the load 204 is connected in parallel with the sampling circuit 23 and the second resistor 28. Because the resistance of the second resistor 28 is much larger than the resistance of the first resistor 231, the resistance of the second resistor 28 can be ignored when considering the resistance of the parallel circuit configured by the sampling circuit 23, the second resistor 28, and the load 204. Therefore even if the resistance of the load 204 varies in a large range, the resistance of the parallel circuit ranges from 0 ohm to 100 ohm. That is, voltages applied to the sampling circuit 23 and the first capacitor 232 vary in a relatively small range along with variation of the resistance of the load 204. In addition, the first capacitor 232 has no power consumption. As a result, the feedback voltage from the first capacitor 232 is accurate. The accurate feedback voltage is applied to the pulse width modulation circuit 25 to adjust the gating time of the transistor 26. Therefore the power supply circuit 20 outputs a steady voltage.

Figure 3:
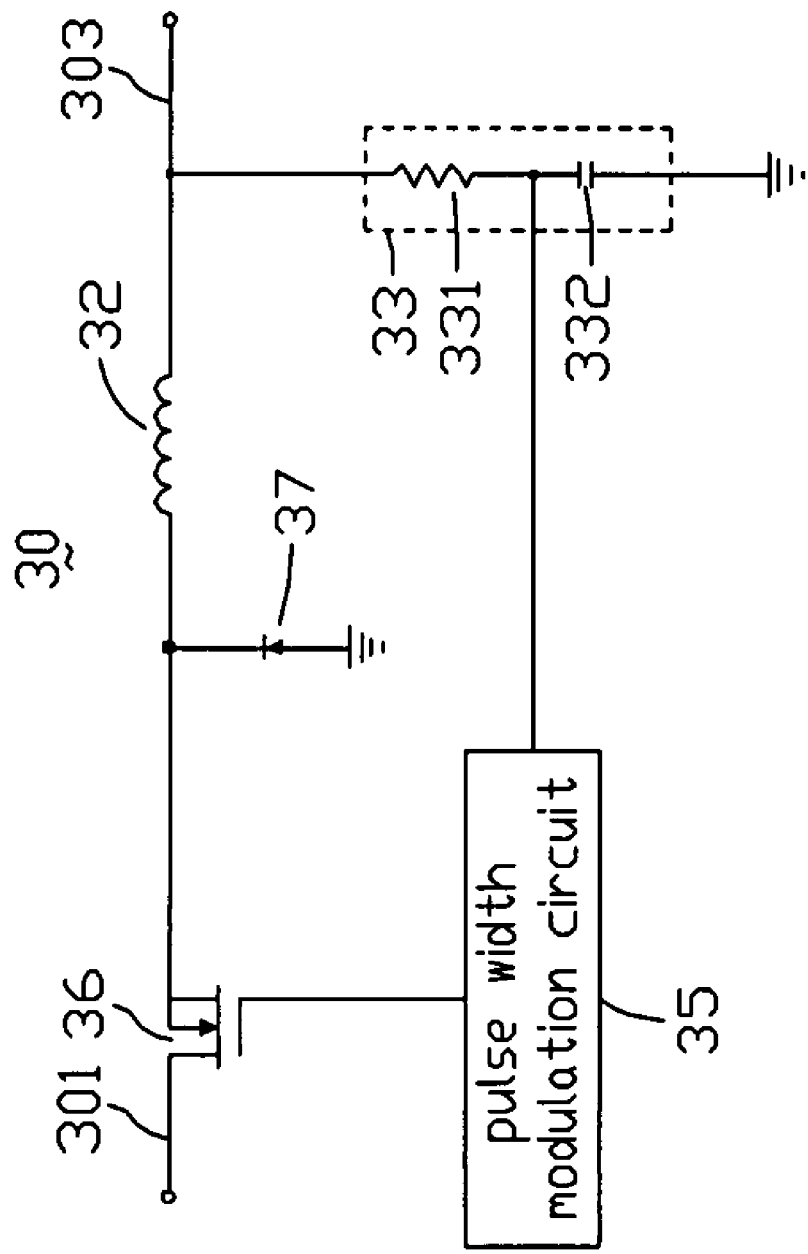
FIG. 3 is a diagram of a power supply circuit for converting DC voltage to DC voltage, according to a second embodiment of the present invention.
Figure 4:
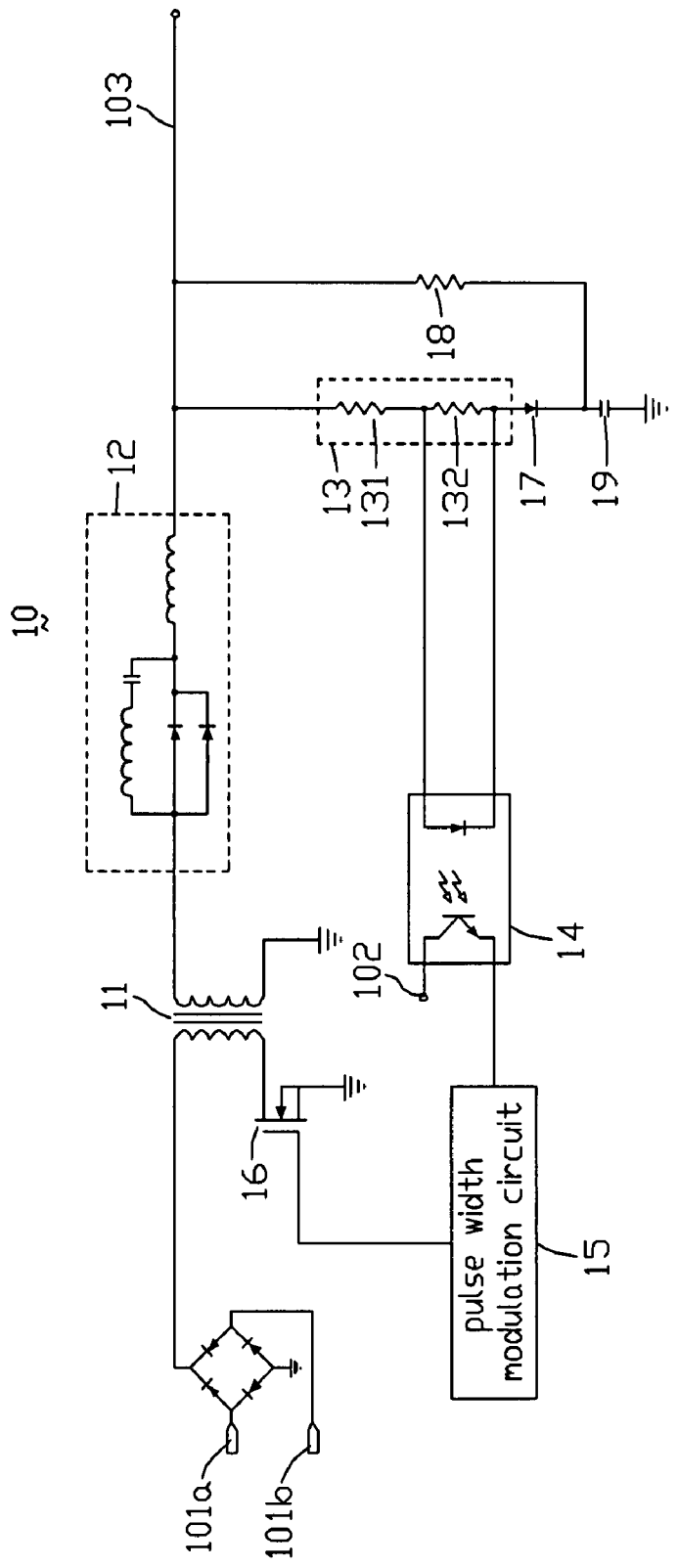
FIG. 4 is a diagram of a conventional power supply circuit.
Figure 5:
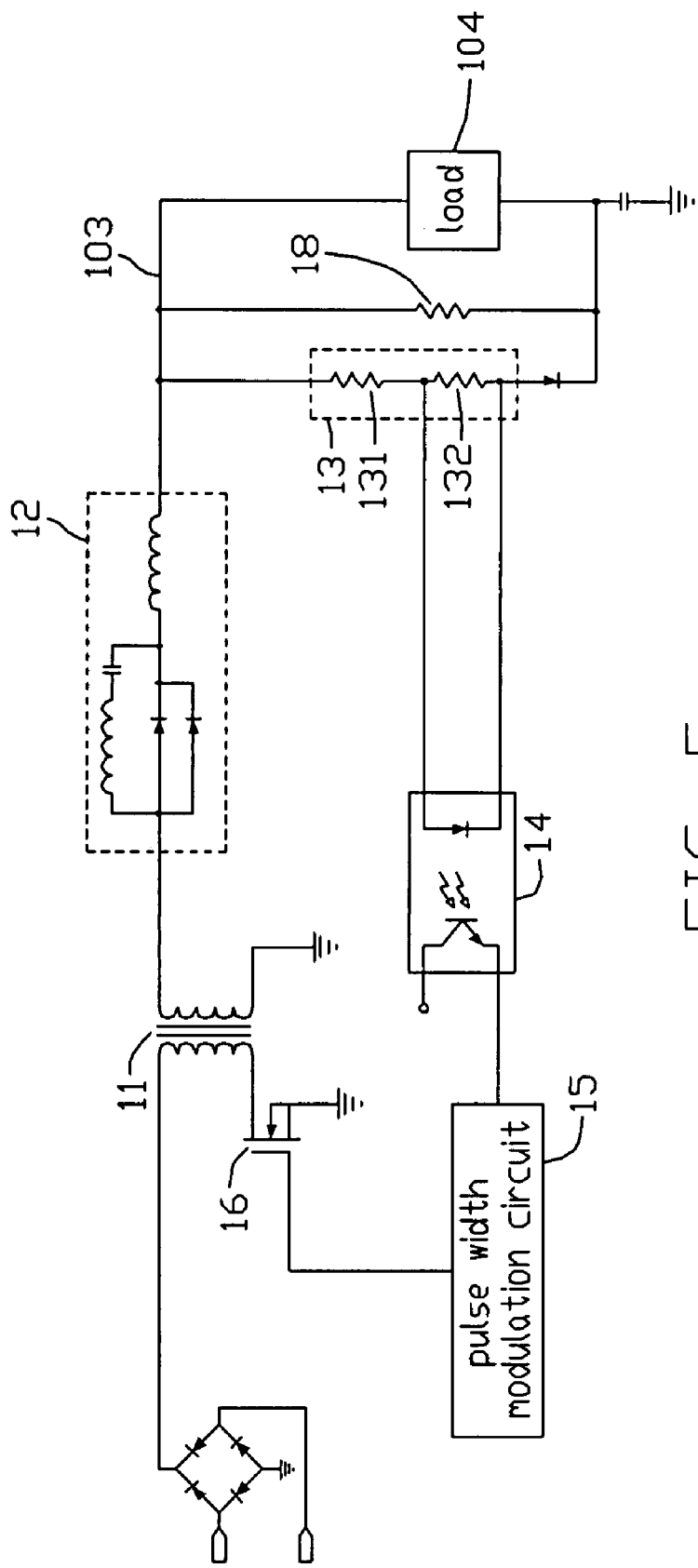
FIG. 5 is a similar to FIG. 4, but showing a load coupled to the power supply circuit.

FIG. 3 is a schematic diagram of a power supply circuit for converting DC voltage to DC voltage, according to a second embodiment of the present invention. The power supply circuit 30 mainly includes a rectification circuit (not labeled), a sampling circuit 33, a pulse width modulation circuit 35, and a transistor 36. The sampling circuit 33 includes a resistor 331 and a capacitor 332 connected in series. A resistance of the resistor 331 may be 100 ohm. A capacitance of the capacitor 332 may be 22 nanofarad. In the illustrated embodiment, the rectification circuit is an inductance 32.

An input terminal 301 of the power supply circuit 30 is coupled to a drain electrode of the transistor 36. A source electrode of the transistor 36 is coupled to an output terminal 303 of the power supply circuit 30 via the inductance 32. One terminal of the resistor 331 is coupled to the output terminal 303, and the other terminal of the resistor 331 is grounded via the capacitor 332. The pulse width modulation circuit 35 is coupled between a gate electrode of the transistor 36 and a tap (not labeled) between the resistor 331 and the capacitor 332. An anode of a diode 37 is grounded, and a cathode of the diode 37 is coupled to a source electrode of the transistor 36.

A DC voltage is applied to the input terminal 301 of the power supply circuit 30. Then the output terminal 303 outputs a flat DC voltage via the transistor 36 and the inductance 32. Similar to the power supply circuit 20, the power supply circuit 30 has relatively low power consumption and outputs a steady voltage, even if a resistance of a load (not shown) coupled to the output terminal 303 varies in a large range.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply circuit, comprising:
   a transformer having a primary coil and a secondary coil;
   a rectification circuit coupled to one terminal of the primary coil;
   a transistor coupled to the other terminal of the primary coil;
   a communicating and filter circuit coupled to the secondary coil;
   a sampling circuit having a first resistor and a first capacitor connected in series;
   a pulse width modulation circuit coupled between the transistor and the sampling circuit; and
   a diode and a second capacitor, wherein an anode of the diode is coupled to the first capacitor, and a cathode of the diode is grounded via the second capacitor;
   wherein an alternating current (AC) voltage is applied to the rectification circuit and is converted into a direct current (DC) voltage via the transformer and the communicating and filter circuit, the DC voltage is fed back to the pulse width modulation circuit via a voltage applied to the first capacitor, and the pulse width modulation circuit adjusts a gating time of the transistor so as to adjust the DC voltage output by the power supply circuit.

2. The power supply circuit as claimed in claim 1, further comprising a second resistor coupled between the communicating and filter circuit and the cathode of the diode.

3. The power supply circuit as claimed in claim 1, wherein a resistance of the first resistor is approximately 100 ohm.

4. The power supply circuit as claimed in claim 1, wherein a capacitance of the first capacitor is approximately 22 nanofarad.

5. The power supply circuit as claimed in claim 1, wherein the transistor comprises a gate electrode, a drain electrode, and a source electrode, the gate electrode is coupled to the pulse width modulation circuit, the source electrode is grounded, and the drain electrode is coupled to the primary coil of the transformer.

6. The power supply circuit as claimed in claim 1, further comprising a feedback circuit coupled between the pulse width modulation circuit and the sampling circuit.

7. The power supply circuit as claimed in claim 6, wherein the feedback circuit comprises an optical coupler.

8. The power supply circuit as claimed in claim 1, wherein one terminal of the first resistor is coupled to the communicating and filter circuit, and the other terminal of the first resistor is grounded via the first capacitor.

* * * * *